A. H. MILLER.
METHOD OF ASSEMBLING ANTIFRICTION BEARINGS.
APPLICATION FILED JUNE 17, 1919.
1,350,325.
Patented Aug. 24, 1920.
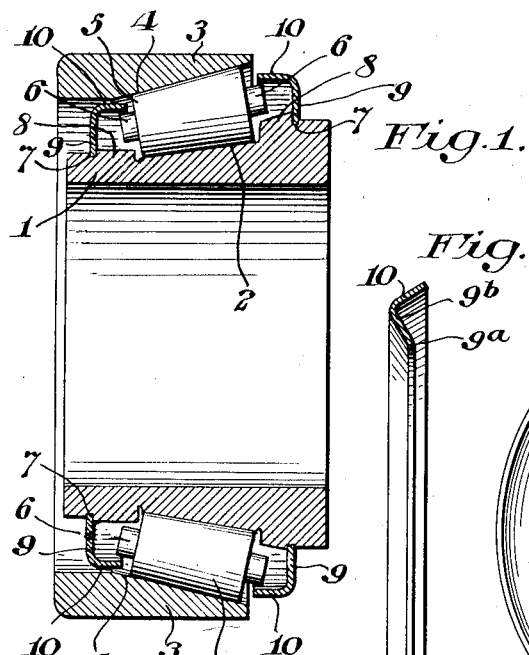
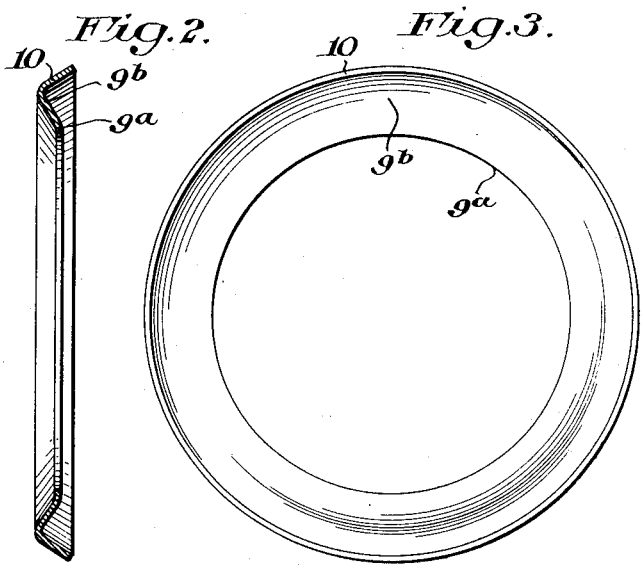
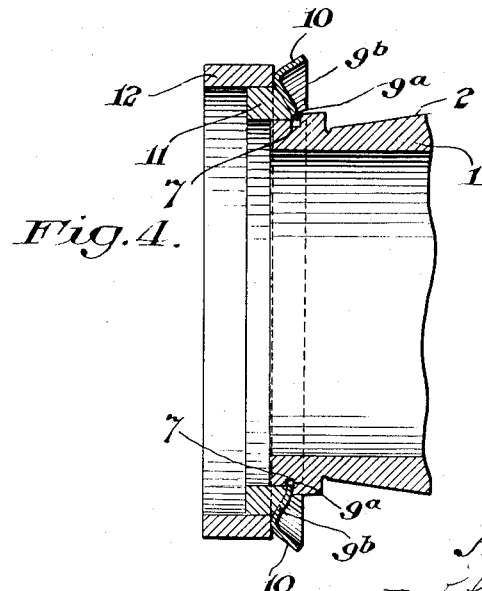
Inventor:
Alfred H. Miller,
By Chester H. Braselton
Attorney.

UNITED STATES PATENT OFFICE.

ALFRED H. MILLER, OF PHILADELPHIA, PENNSYLVANIA, ASSIGNOR, BY MESNE ASSIGNMENTS, TO WRIGHT ROLLER BEARING COMPANY, OF PHILADELPHIA, PENNSYLVANIA, A CORPORATION OF DELAWARE.

METHOD OF ASSEMBLING ANTIFRICTION-BEARINGS.

1,350,325.	Specification of Letters Patent.	Patented Aug. 24, 1920.

Application filed June 17, 1919. Serial No. 304,958.

*To all whom it may concern:*

Be it known that I, ALFRED H. MILLER, a citizen of the United States, residing at Philadelphia, Pennsylvania, have invented certain new and useful Improvements in Methods of Assembling Antifriction-Bearings, of which I declare the following to be a full, clear, and exact description.

This invention relates to improvements in the method of assembling anti-friction bearings. My invention relates particularly to an improved method for mounting in place on one of the bearing members the retaining rings which are commonly employed to prevent the removal of the anti-friction elements from the bearing member.

The principal object of my invention is to provide an improved method for mounting such retaining rings in place which will reduce the cost of assembly and produce a bearing in which the retaining rings are anchored more firmly and rigidly in place. Another object of my invention is to provide an improved method for mounting such retaining rings in which it shall be unnecessary to heat the rings.

Further objects, and objects relating to economies in material and details of operation, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawing, forming a part of this specification, in which:

Figure 1 is a transverse, sectional view taken through a bearing constructed in accordance with my invention.

Fig. 2 is a sectional view through the dished retaining ring.

Fig. 3 is a plan view of said ring.

Fig. 4 is a fragmentary view of one end of the cone member showing the dished retaining ring pressed into place and ready to be given the second pressing operation to straighten the web.

In the drawing, similar reference numerals refer to similar parts throughout the several views.

Referring to the drawings, I have shown a bearing comprising the inner bearing or cone member 1 having an external conical bearing surface 2, and the outer bearing or cup member 3 having an internal conical bearing surface 4. A plurality of rollers 5 are interposed between these bearing surfaces and roll upon them. Each roller 5 has a retaining pin 6 extending axially from each end thereof. Annular grooves 7 are provided in the cone member adjacent the ends thereof and annular flanges 8 are formed on the cone member with the side wall of each of said flanges forming a continuation of the side wall of the groove 7. Retaining rings are provided comprising the web 9, the inner periphery of which is seated in the groove 7, and a laterally extending flange 10 which overhangs the ends of the retaining pins 6 on the rollers 5 and serves to prevent their removal from the cone member.

A dished retaining ring is formed from a metal blank, as shown in Fig. 2, the web being made up of two parts $9^a$ and $9^b$ at an angle to each other and the flange 10 extending substantially at right angles to the part $9^b$ of the web. The ring in this state has an internal diameter such that it will just clear the outer end of the cone and can be moved into the position shown in Fig. 4 in which the part $9^a$ of the web is in line with the groove 7. After the ring has been moved into this position and while it is held pressed in engagement with the shoulder 8, pressure is brought to bear on the outer periphery of the ring at substantially the angle between the web and the flange 10 and in a direction parallel to the axis of the ring so as to straighten the web and bring the parts $9^a$ and $9^b$ into the same plane. The flange 10 being heavier and thicker tends to resist any expansion of this part and consequently this straightening of the dished retaining ring causes the inner edge of the web to be forced into the grooves 7, as shown in Fig. 1. In practice, I prefer to accomplish this operation by means of a pair of dies, such as shown in Fig. 4. The inner annular die 11 moves in first and presses the retaining ring into position with its inner periphery engaging the shoulder 8 and in line with the groove 7. The outer annular die 12 then follows up and exerts a pressure on the ring in line with the flange 10 which, since the inner edge of the ring is held by the die 11, straightens out the web and crimps the inner edge into the groove 7. In this manner the ring is firmly and rigidly mounted in place by an operation which can be accomplished cheaply and expeditiously and which eliminates all necessity for heating the retaining ring.

I have shown the two retaining rings pressed into place from opposite ends of the cone member. The ring at the larger end of the cone might be pressed on from the small end and in that case the positions of shoulder 9 and taper 7 and the direction of the inclined surface forming the bottom of the groove 8 would be reversed. This method is also applicable to mounting retaining rings on the cup member instead of the cone member in which case the ring is so dished that straightening of the web expands the outer edge into the seating groove.

I am aware that the particular embodiment of my invention, which I have here illustrated and described, is susceptible of considerable variation without departing from the spirit thereof, and, therefore, I desire to claim the same broadly, as well as specifically, as indicated by the appended claims.

Having thus described my invention, what I claim as new and desire to secure by Letters Patent, is:

1. The method of mounting retaining rings on an annular member provided with an annular groove in which the ring is to seat comprising pressing a retaining ring having a dished web upon said member into line with said groove, and then straightening the web of said ring.

2. The method of mounting retaining rings on an annular member provided with an annular groove in which the ring is to seat comprising pressing a retaining ring, having a dished web, upon said member into line with said groove, holding the inner portion of said web in such position, and then straightening the said web.

3. The method of mounting retaining rings on an annular bearing member provided with an annular seating groove for said ring comprising pressing a retaining ring having a dished web on said member into line with said groove, clamping said ring in such position, and then pressing the outer part of said web axially to straighten the web.

4. The method of mounting retaining rings on an annular bearing member having an annular seating groove for said ring comprising pressing a retaining ring, having a dished web and a flange extending laterally from the outer periphery thereof, on said member into line with said groove, clamping the inner part of the web in such position, and then pressing the outer part of said web axially to bring all parts of said web into the same plane.

5. The method of mounting retaining rings on an annular bearing member having an annular seating groove for said ring and an annular flange forming one wall of said groove comprising pressing a retaining ring having a dished web on said member into engagement with said flange and into line with said groove, holding said ring in such engagement, and then pressing the web of said ring in a direction to remove the dish and straighten the web.

6. The method of mounting retaining rings on an annular bearing member having an annular seating groove for said ring and an annular flange forming one side wall of said groove, comprising the pressing on said member into engagement with said flange and into line with said groove of a retaining ring with a web having inner and outer portions at an angle to each other and a flange extending substantially perpendicular to the outer portion of said web, holding the inner portion of said web in such engagement, and then applying pressure to the outer portion of the web to bring all parts of the web into the same plane.

In testimony whereof, I affix my signature.

ALFRED H. MILLER.